United States Patent [19]

Waite et al.

[11] Patent Number: 5,103,476
[45] Date of Patent: Apr. 7, 1992

[54] SECURE SYSTEM FOR ACTIVATING PERSONAL COMPUTER SOFTWARE AT REMOTE LOCATIONS

[76] Inventors: David P. Waite, Fairfax; Horace G. Riddell, Chantilly, both of Va.

[21] Appl. No.: 610,037

[22] Filed: Nov. 7, 1990

[51] Int. Cl.$^5$ .............................................. H04L 9/32
[52] U.S. Cl. ........................................ 380/4; 380/25; 380/49
[58] Field of Search .................... 350/53, 4, 23, 25, 49, 350/50; 371/37.7; 364/246.9, 286.4–286.6, 949.81

[56] References Cited

U.S. PATENT DOCUMENTS

| 4,446,519 | 5/1984 | Thomas | 364/300 |
|---|---|---|---|
| 4,458,315 | 7/1984 | Uchenick | 380/4 |
| 4,593,353 | 6/1986 | Pickholtz | 364/200 |
| 4,597,058 | 6/1986 | Izumi et al. | 364/900 |
| 4,649,510 | 3/1987 | Schmidt | 364/900 |
| 4,652,990 | 3/1987 | Pailen et al. | 364/200 |
| 4,658,093 | 4/1987 | Hellman | 380/25 |
| 4,685,055 | 8/1987 | Thomas | 364/200 |
| 4,719,565 | 1/1988 | Moller | 364/200 |
| 4,740,890 | 4/1988 | William | 380/4 X |
| 4,796,220 | 1/1989 | Wolfe | 364/900 |
| 4,924,378 | 5/1990 | Hershey et al. | 364/200 |
| 4,937,863 | 6/1990 | Robert et al. | 380/4 |
| 4,941,175 | 7/1990 | Enescu et al. | 380/4 |
| 4,953,209 | 8/1990 | Ryder, Sr. et al. | 380/23 |
| 4,999,806 | 3/1991 | Chernow et al. | 380/4 X |

Primary Examiner—Bernarr E. Gregory
Attorney, Agent, or Firm—Hoffman, Wasson & Gitler

[57] ABSTRACT

A process and system for activating various programs are provided in a personal computer. The computer is initially provided with a portion of a main program. A data link is established between the personal computer and a registration computer. By providing the registration computer with various information, a potential licensee can register to utilize the program. Once the registration process is complete, a tamperproof overlay program is constructed at the registration computer and transferred to the personal computer. The tamperproof overlay includes critical portions of the main program, without which the main program would not operate and also contains licensee identification and license control data.

13 Claims, 3 Drawing Sheets

SECURE SYSTEM FOR ACTIVATING PERSONAL COMPUTER SOFTWARE AT REMOTE LOCATIONS

BACKGROUND OF THE INVENTION

Generally speaking, most users of personal computers or similar devices obtain additional computer software to run on their devices by purchasing this software in various retail outlets or by obtaining this additional software through the mail. In both situations, a "shrink-wrap" material encases the software product and a license agreement is implied by the removal of the shrink wrap material in an endeavor to protect the licensor of the product from unauthorized copying and use of the product by the licensee/purchaser. This method of doing business has proved to be inadequate for both the licensee and the licensor. For example, the licensee is not given an opportunity to initially operate the software program to determine whether this program would suit the licensee's needs. Additionally, from the licensor's point of view, identification of the licensee and a means of controlling or monitoring the use of the program by the licensee are not provided by this technique.

Consequently, a method and system for allowing a potential purchaser/licensee to test a software program prior to purchasing the product is needed. Furthermore, a method and system in which the licensor is afforded protection as well as more precisely monitoring the licensees is warranted.

BRIEF DESCRIPTION OF THE INVENTION

The present invention is directed to a method and a system for permitting personal computer software programs or other types of programs to be distributed in an inactive condition. Subsequently, based upon various criteria, the program will be made active due to a particular transaction between the purchaser/licensee and the seller/licensor. Although the relationship between the seller and the purchaser need not be a licensor/licensee agreement, for the purposes of the present invention, we will refer to the seller as the licensor and the purchaser as the licensee or user. Once the licensee agrees to the terms of the particular transaction, licensee identification data is provided to a registration computer. The registration computer records the transaction and provides certain essential segments to the licensed program. These segments are both tamperproof and unique to the identified licensee. Based upon this exchange of information, the computer program that was inactive becomes operational.

Generally speaking, the inactive or unusable software programs are first distributed to potential licensees by physically conveying copies of a master on magnetic media, or by electronic transfer. Additionally, these programs may be broadcast as electromagnetic information, or they may have been included as firmware or hardware logic in the personal computer at the time of manufacture. These programs contain all of the segments of a particular program code except for a critical segment of an operational control loop without which the program process is incapable of sustained operation. Additionally, special program modules called a loader segment and a registration shell are distributed with the inactive software program. Once all of the appropriate information is relayed to the registration database computer, the essential segments of the particular program are transferred or transmitted as a tamperproof overlay file to the registration shell and installed on the personal computer. Subsequently, the loader segment will activate the main program by providing the essential segment each time the main program is loaded for execution.

Security features are included to prevent execution of the main program files with counterfeit, altered, or unauthorized essential segments. Security features are also included to ensure that all copies of the activated program will include unique licensee identification data, thereby allowing unauthorized copies to be traced to the original licensee.

BRIEF DESCRIPTION OF THE DRAWINGS

FIG. I is a flow diagram of the registration process according to the present invention;

FIG. II is a flow diagram of the program execution process according to the present invention; and FIG. III is a block diagram of a typical personal computer and central computer according to the teachings of the present invention.

DETAILED DESCRIPTION OF THE INVENTION

Figure 1:
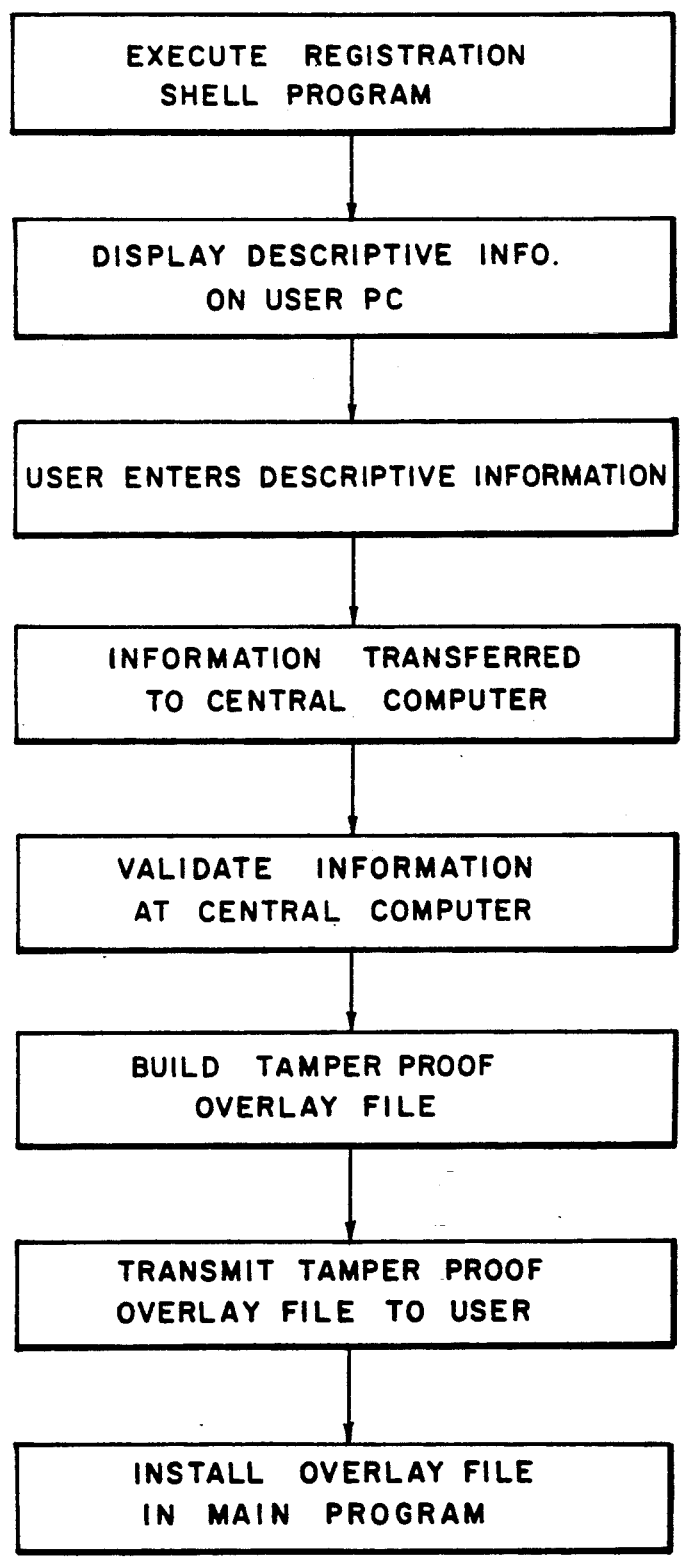
Figure 2:
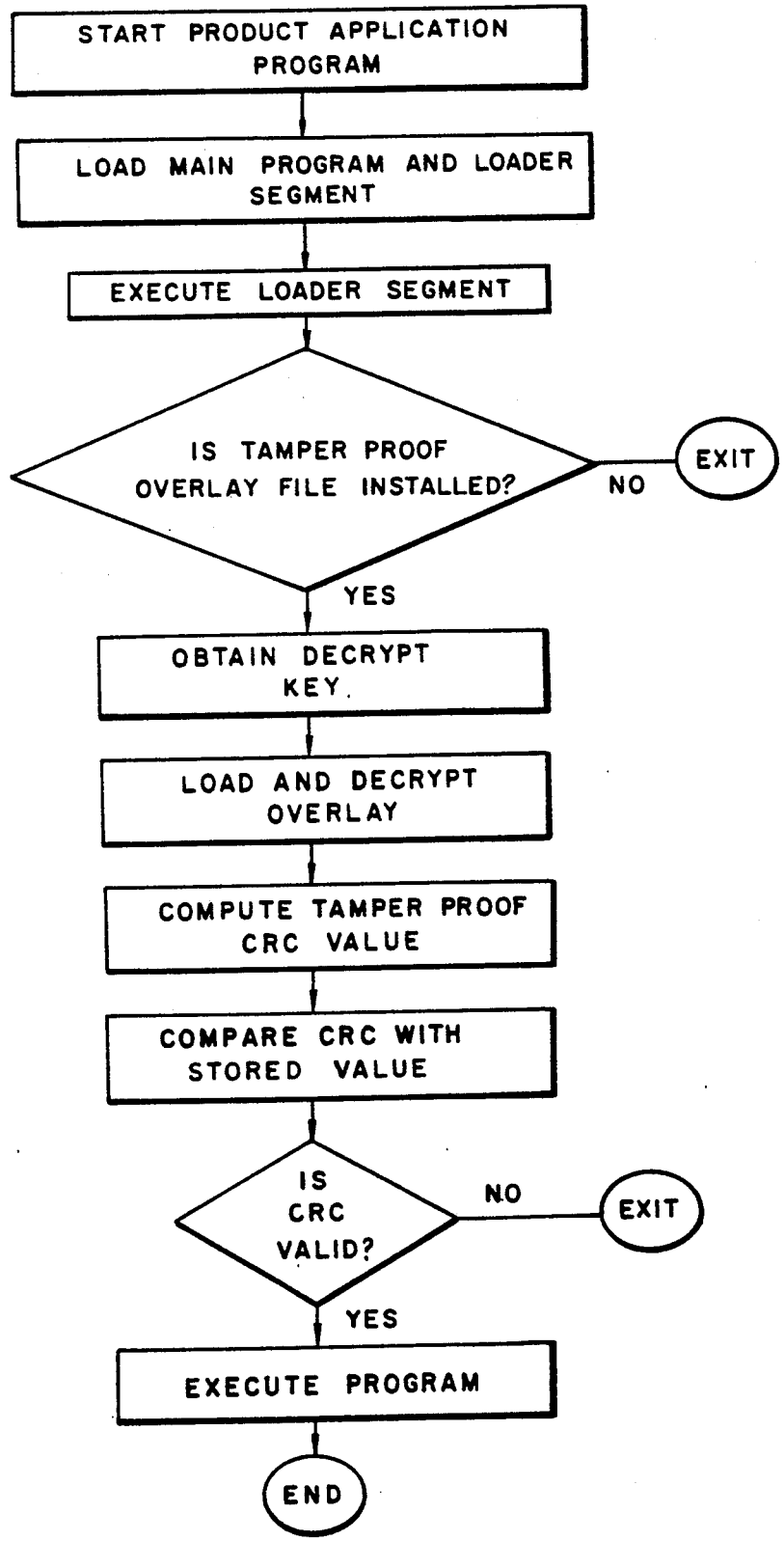
Figure 3:
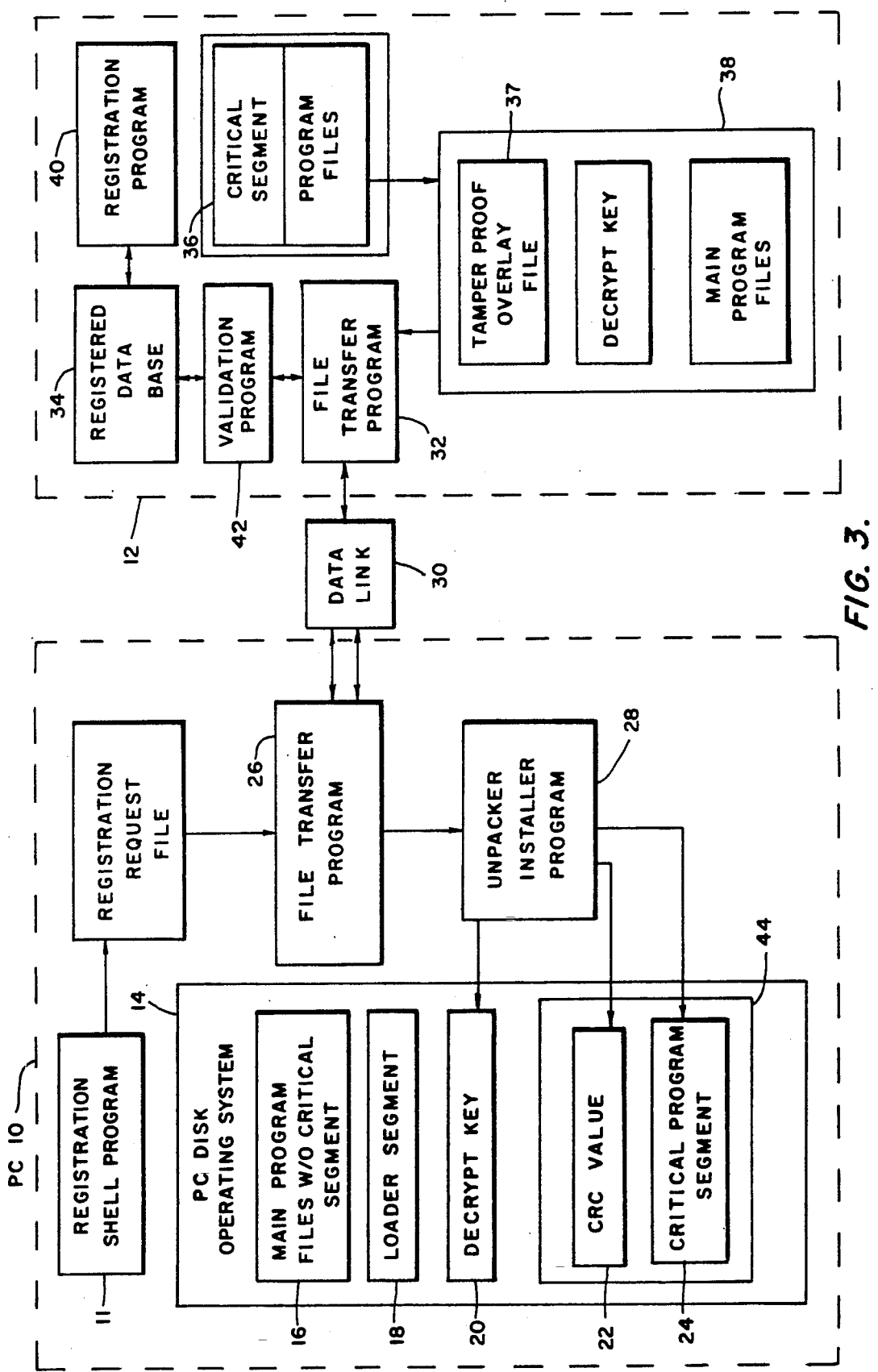

The purpose of the present invention is to allow a licensor to maintain accountability of its programs in a manner much more efficient than presently being utilized. Additionally, a second purpose of the present invention is to allow a licensee or user to test a particular program before it is purchased or licensed. Therefore, it is contemplated that the teachings of the present invention are considered to be comprehensive and that any software program could be used.

Initially, a particular program which does not contain a critical or essential segment is provided in a personal computer or other device on a magnetic disc, firmware, hardware, or other means. However, in the case of small or extremely valuable programs, the essential segment may be the entire main program. Additionally, a registration shell program is also included with the particular program. However, due to the exclusion of the critical segment, the program would not operate without the implementation of the proper registration process. As shown in FIGS. I and III, this registration process is initiated utilizing a registration shell program 11 in the personal computer (PC) 10 as well as a registration program 40 provided in a registration computer 12. Although it is contemplated that the registration shell program would be distributed along with the product application program, this need not be the case. A registration system program is provided in the registration computer 12 and is accessible to the registration shell program 11 by an electronic data link 30. The electronic data link may be a local area network, a telephone modem link, or any other type. However, it should be noted that in a second embodiment, the registration shell and the registration system programs could be on the same medium, but separate from the product application program. In this instance, the transportable media containing the registration shell and the registration systems program are personally transported to the personal computer 10 of the user by a licensed installer, and no electronic data link is needed.

The registration shell program is executed when the user first attempts to execute the product application program provided in the main program file 16 of the PC operating system 14. The registration shell provides and displays on the PC display, descriptive information about the product application program and prompts the potential licensee to register as a user. The license could be assigned specifically for a particular licensee at a particular site and could be for varying lengths of time or on a temporary trial basis which is offered at no cost to the licensee.

The registration shell program 11 would provide a data entry form which would be displayed on the licensee PC, requesting the licensee to provide identification information, such as a billing address, an account number and the term of the license, etc. This information is entered into a registration request file 25 which is reviewed by the licensee. The registration shell program would then wait for the licensee to initiate registration by pressing a designated key. When this key is pressed, the registration file is closed and a registration shell file transfer program 26 establishes a data link with the registration system file transfer program 32. The registration program 40 in the registration computer is protected by a validation means 42 to perform a security check ensuring that the data link has been established with a legitimate registration shell. The registration shell then transmits the registration request file 25 to the registration system which would receive the file, and perform the necessary error checking and handshaking operation between linked file transfer programs 26 and 32. When the complete registration request file is received at the central registration computer, the registration request is validated against a database of registered users 34. The validation would involve various checks to determine if the request should be fulfilled. For example, if a second request for a temporary license is received from a particular licensee, a license would not be granted to the licensee and the critical segments of the program would not be transmitted. If this should occur, an appropriate message would be transmitted to the registration shell for display to the potential licensee. However, if the request is validated, a record entry into the registered user database is prepared, but is not entered until the entire process is complete.

The user identification data is then used to build a unique tamperproof overlay file generated by merging the user identification data with critical segment program instructions 36. A cyclic redundancy check (CRC) value is computed which is unique to the merged data and program files and included within the tamperproof overlay file 37. A unique set of encryption and decryption keys is generated and the entire contents of the tamperproof overlay file is encrypted using the encryption key. Based upon the encryption key, a decryption key is provided which is transferred along with the tamperproof overlay file. The encryption algorithm can be any technique which uses a different key for encryption and decryption similar to the public key encryption system. The registration system assembles the tamperproof overlay file and the decryption key into a single shipping file 38 for transmission to the registration shell of the personal computer. Updated main program files may also be included into the shipping file which is transmitted to the registration system of the PC by means of file transfer programs and the previously established data link.

Upon receipt of the complete shipping file, an unpackerinstaller subprogram 28 in the registration shell program opens the shipping file and installs the tamperproof overlay file 40 including the critical program segment 24, CRC value 22, as well as the decryption key 20 and the updated main program files, if included. The electronic data link may be disconnected. The registration process is now complete. The registration data base record is entered and billing for the licensee request may be performed by a separate program on the central registration computer 12.

After registration, the distributed product application program installed on the licensee's personal computer may be activated for use by a process that uses the tamperproof overlay file and the decrypt key to load a complete product application program for execution each time the product application program is run.

This product application activation process is illustrated in FIG. II. As shown therein, when the personal computer user commands the operating system to run the product application program, the operating system will load the main program and the loader segment. The loader segment will execute before any other program instructions. The loader segment then executes the activation of the product application program starting with a test for the presence of the tamperproof overlay. If no tamperproof overlay has been installed, the loader segment exits to the operating system, thus preempting the execution of the main program files. If, however, a tamperproof overlay has been installed, the loader segment finds the decryption key and proceeds to decrypt and load the tamperproof overlay, overlaying the main program files with the missing critical segment program instructions as well as the unique identification and license control data. A cyclic redundancy check is performed during the decrypt and load process and, at completion, is compared to the cyclic redundancy check value stored in the tamperproof overlay when it was generated and transmitted by the registration computer to the PC. If the cyclic redundancy check fails, the overlay is considered to have been modified in some way, and is therefore invalid. At this point, the loader segment will unload the overlay and exit to the operating system. Therefore, as was true with respect to the non-inclusion of the tamperproof overlay, the execution of the main program files is preempted when any portion of the tamperproof overlay is modified. If the cyclic redundancy check confirms that the overlay has not been modified, the loader segment initiates the execution of the main program files with the overlay included and the product application program executes to completion.

By requiring the tamperproof overlay to be included in any operable form of the product application program, licensee identification and license control data are always included in subsequent copies of the operable program. Thus license abuse may be curtailed and monitored by the licensor.

As described with respect to FIGS. I and II, the registration process, according to the present invention, produces a tamperproof overlay file which includes critical portions or segments of a main program file and license control data. When the registration process is complete, this tamperproof overlay file is transferred from the registration computer to the personal computer. The tamperproof overlay is the key device that prevents license abuse after activation because the critical segment of program instructions may not be separated from the unique licensee identification data and license control data without detection, nor may the licensee identification and license control data be changed without detection.

The tamperproof overlay file is considered to be made tamperproof by initially storing a cyclic redundancy check value within the overlay file when the overlay file is generated. The cyclic redundancy check value is computed for the entire contents of the overlay file including program instruction and licensee data. Since licensee data is unique, each CRC will be unique. The stored CRC value is compared to the cyclic redundancy check value computed by the loader segment each time the overlay is loaded. If the cyclic redundancy check values do not agree, the loader segment will exit to the operating system. Thus, any change to the overlay file contents renders the overlay file defunct, unless a corresponding change the stored cyclic redundancy check value is also made. Secondly, the entire contents of the tamperproof overlay are encrypted by the registration system in such a manner as to obscure the location of the cyclic redundancy check value, thus making it difficult to locate and change its value. Encryption also obscures the specific program instructions contained in the critical segment of this portion and the unique user identification and license control data as well. Encryption is accomplished by any technique that uses a different key for encryption than for decryption similar to the public key encryption system. The algorithm for encryption and for generating the unique encryption key and the decryption key resides in the registration system and is therefore inaccessible to the licensee. The decryption key is transmitted to the licensee's computer through the registration system and the registration program shell. Since the algorithm for decrypting the overlay file is in the loader segment, it is possible, although difficult, to use the decrypt key and the decrypt algorithm to decrypt the overlay file and examine its contents. However, attempts to change the contents and encrypt a new, altered overlay file are hindered by a lack of access to the encryption key. It is a characteristic of the public key encryption system that only overlay files encrypted with a complimentary encryption key may be decrypted using a complimentary decryption key.

The tamperproof overlay file contains both the critical segment of the program instructions as well as unique user identification data which is appropriate to the method and control of the license. This data would include the time period of the license, the serial number of the computer, the telephone number of the computer's modem, as well as additional information.

The loader segment 18 is a special purpose subprogram that is linked with the main program files of the product application program by a technique that renders the main program files inoperable if the loader program is removed or bypassed. The linking technique is a process that embeds certain program instructions within the main program files of the product application program. These embedded instructions test for specific values at specific memory locations unknown to the user. When the loader program segment is executed, it stores the specific values at specific memory address locations required to allow the main program files to operate. The loader program segment does this in addition to its other functions. Thus, if the loader segment is removed, or bypassed, the main program files will not contain the specific values at specification locations and are inoperable.

Obviously, many modifications and variations of the present invention are possible in light of the above teachings. For example, it is envisioned that this invention may be implemented in a tiered architecture wherein user computers are linked to a local registration computer which is in turn linked to a regional registration computer, and so on. The registration authority of the local registration computer could be controlled by the license control data included in a transaction between the local registration computer and the regional registration computer. It is therefore to be understood that within the scope of the appended claims, the invention may be practiced otherwise than as specifically described.

What is claimed is:

1. A method of activating a program file, comprising the steps of:
   providing a program file including a loader segment and a registration shell portion to a remote computer having a display, said program file lacking a critical portion, preventing said program file from operating properly,
   entering user identification information in said registration shell portion;
   transmitting said user identification information from said registration shell to a separate registration program provided in a registration computer, said registration program merging user identification data with said critical portion to generate a unique overlay file;
   transmitting said unique overlay file from said registration program to said registration shell, said overlay file containing the critical portion originally lacking from said program file; and
   installing said overlay file in said program file, thereby allowing operation of said program file only when user identification contained in said overlay file is presently installed.

2. The method in accordance with claim 1 further comprising the step of validating said user identification information prior to transmitting said overlay file from said registration computer to said remote computer.

3. The method in accordance with claim 2, wherein said validating step insures that said user identification information is provided a legitimate registration shell.

4. The method in accordance with claim 1, further comprising the step of creating an overlay file which is tamperproof.

5. The method in accordance with claim 4, wherein said tamperproof overlay file is created by encrypting said overlay file, providing a cyclic redundancy check value within said encrypted overlay file and providing a decrypt key to said overlay file.

6. The method in accordance with claim 5, wherein the cyclic redundancy check value is computed each time said overlay is loaded for execution and compared to the cyclic redundancy check value transmitted within said tamperproof overlay file to determine whether said overlay file has been modified since generation.

7. The method in accordance with claim 1, wherein said user identification information and said overlay file are transmitted between said registration shell and said registration program through an electronic data link.

8. The method in accordance with claim 1, wherein said user identification and said overlay file are entered and installed on a single computer.

9. A system for activating a program file for a limited or unlimited period of time comprising;
   at least one remote computer, initially provided with a program file containing an overlay loader segment but lacking at least one critical program segment, preventing operation of the program file, said overlay loader segment only enabling activation of the program file when an authentic overlay file is presently installed, said remote computer provided with a registration shell program, said registration shell program enabling a user to enter various user identification information;

a registration computer provided with a registration program, a means for receiving and processing said user identification information, a means for creating a unique overlay file containing the critical program segment lacking from the program file and all or portions of the user identification information, and a means for transmitting said overlay file to said remote computer, wherein transmission of said overlay file to said remote computer would allow operation of said program file only when user identification contained in said overlay file is presently installed.

10. The system, for activating a program file in accordance with claim 9, further including an electronic data link between said remote computer and said registration computer and file transfer processes provided in both said registration computer and said remote computer.

11. The system for activating a program file in accordance with claim 9, wherein said registration computer is provided with a central data base including all registered users as well as a means for validating said user identification information.

12. The system for activating a program file in accordance with claim 9, wherein said means for creating an overlay file is provided with an encryption device for producing a tamperproof overlay file with a cyclic redundancy check value stored therein, and a decrypt key, and further wherein said decrypt key is transmitted to said remote computer along with said overlay file.

13. The system for activating a program file in accordance with claim 12, wherein said remote computer is provided with a means for decrypting said overlay file, calculating a cyclic redundancy check value each time said overlay file is loaded for execution, and comparing this check value to the redundancy check value transmitted by said registration computer within said overlay file.

* * * * *